US012338102B2

(12) United States Patent
Rohr et al.

(10) Patent No.: US 12,338,102 B2
(45) Date of Patent: Jun. 24, 2025

(54) SAFETY GEAR FOR AN ELEVATOR SYSTEM

(71) Applicants: Elgo Batscale AG, Balzers (LI); Cobianchi Liftteile AG, Oberdiessbach (CH)

(72) Inventors: Stephan Rohr, Triesen (LI); Hermann Gehrig, Munsingen (CH); Sergej Zinenko, Heilgkreuz (CH); Dominik Helfer, Munsingen (CH)

(73) Assignees: Elgo Batscale AG, Balzers (LI); Cobianchi Liftteile AG, Oberdiessbach (CH)

( * ) Notice: Subject to any disclaimer, the term of this patent is extended or adjusted under 35 U.S.C. 154(b) by 0 days.

(21) Appl. No.: 18/113,508

(22) Filed: Feb. 23, 2023

(65) Prior Publication Data

US 2023/0286779 A1 Sep. 14, 2023

(51) Int. Cl.
*B66B 5/18* (2006.01)

(52) U.S. Cl.
CPC .................................... *B66B 5/18* (2013.01)

(58) Field of Classification Search
CPC ....... F16D 59/02; F16D 2121/22; B66B 5/18; B66B 5/16; B66B 1/26
See application file for complete search history.

(56) References Cited

U.S. PATENT DOCUMENTS 4,102,444 A * 7/1978 Palme .................... F16D 59/02
188/106 P
6,178,837 B1 * 1/2001 Nagai .................... F16D 59/02
74/89.23

(Continued)

FOREIGN PATENT DOCUMENTS

CN 111362093 A 7/2020
CN 111731964 A 10/2020

(Continued)

OTHER PUBLICATIONS

Machine translation of EP 2837592 A1 (Year: 2015).*

(Continued)

*Primary Examiner* — Anna M Momper
*Assistant Examiner* — Michelle M Mudwilder
(74) *Attorney, Agent, or Firm* — GrowIP Law Group LLC

(57) ABSTRACT

The present invention relates to a triggering mechanism for a gripping device in an elevator system, comprising a supporting frame, a triggering element that can move axially in the supporting frame, which has a triggering rod on the end that extends through an end section of the supporting frame that can be attached to an activation lever for the gripping device, springs that act on the triggering element at least when in a first standby position, and magnetic retaining means, which are designed to retain the triggering element in the standby position against the spring tension when supplied with electricity, wherein the triggering element is designed as a frame-like slide element, which has two guide strips extending in the axial direction of movement for guiding the frame-like slide element in the supporting frame, and a connecting strip at a right angle to and connecting the guide strips, on which the triggering rod is supported.

20 Claims, 8 Drawing Sheets

(56) References Cited

U.S. PATENT DOCUMENTS

| | | | | |
|---|---|---|---|---|
| 8,631,909 | B2 * | 1/2014 | Draper | B66B 5/06 187/373 |
| 9,341,248 | B2 * | 5/2016 | Wu | F16C 29/005 |
| 10,889,468 | B2 * | 1/2021 | Hu | B66B 5/22 |
| 2018/0354749 | A1 | 12/2018 | Fauconnet et al. | |
| 2022/0363514 | A1 * | 11/2022 | Russwurm | B66B 5/18 |
| 2023/0076606 | A1 * | 3/2023 | Schwaigerlehner | B66B 5/18 |

FOREIGN PATENT DOCUMENTS

| | | | | |
|---|---|---|---|---|
| DE | 102013111385 | A1 * | 4/2015 | B66B 5/18 |
| DE | 202019105584 | U1 * | 11/2019 | |
| EP | 2837592 | A1 * | 2/2015 | B66B 5/18 |
| EP | 3677534 | A1 * | 7/2020 | B66B 1/3423 |

OTHER PUBLICATIONS

Machine translation of DE 202019105584 U1 (Year: 2019).*
Extended European Search Report for Application No. EP22158353, mailed Aug. 19, 2022 (entire document).

* cited by examiner

SAFETY GEAR FOR AN ELEVATOR SYSTEM

RELATED APPLICATIONS

The present application claims the benefit of European Patent Application No. 22158353.7, filed on Feb. 23, 2022, which is incorporated by reference herein in its entirety.

FIELD

The present technology relates to a triggering mechanism for a gripping device for an elevator system.

BACKGROUND

There are gripping devices for elevators which prevent, in particular, an uncontrolled downward or upward acceleration of an elevator car if the suspension means malfunctions. The gripping device normally has a brake, for example, in the form of a so-called gripping clamp with brake shoes on either side of an elevator car guide rail that clamp onto the guide rails when the gripping device is triggered. A speed regulator for the gripping device monitors the upward and/or downward speed of the elevator car and triggers the gripping device when a predefined tolerance value is exceeded. The speed regulator is normally independent of the other components of the elevator system, and functions mechanically, thus ensuring that it continues to function correctly even if there is a power failure. The speed regulator comprises a steel cable sling encircling rollers at the upper and lower ends of the elevator shaft, one of which has a centrifugal force monitoring unit, which stops the cable when the rotation of the roller is too fast, and triggers the gripping device via an activation lever connected to the sling.

Newer technologies involve electronic speed monitoring, e.g. the Safebox introduced by ELGO in 2015, which has a reliable position sensor Limax33RED, or more advanced compact sensors such as the products in the LimaxCP series. The reliable electronic signal that is generated to trigger a gripping device must be converted to a reliable mechanical movement by the appropriate devices. Gripping devices from Wittur ESG or Dynatech eASG, for example, contain electromagnets that hold the clamps open against a spring force, such that when the power to the electromagnets is interrupted, the gripping device is triggered.

These commercially available solutions have the disadvantage that they cannot be used with conventional gripping devices, and thus require a complete reconstruction of the gripping device. Replacing the entire gripping device in existing elevator systems is complicated and expensive.

There are also triggering devices for conventional gripping devices with which the gripping device can be triggered in the event of an emergency without a mechanical speed regulator and cable sling. The triggering mechanism needed for this is operated magnetically, and when triggered, enables the necessary tractive force of 300 N, for example, and a lifting movement of up to 100 mm that is needed to trigger a conventional gripping device.

CN 111 731 964 A discloses a triggering mechanism of this type for a gripping device in an elevator system for replacing a conventional speed regulator, comprising a retaining frame, a triggering element that can move axially in the retaining frame, which has a triggering rod on one end that extends through an end of the retaining frame, which is connected to the gripping device, and compression spring that is coaxial to the triggering rod, which functions as a return element and holds the triggering element in a first standby position. The triggering element is held in place against the spring force exerted thereon by the interaction of a first magnetic connecting element on the triggering element in the form of a metal strip and a second connecting element on a clamping slide in the device in the form of a magnet that can be activated, which is deactivated by a control signal from the triggering element, such that an axial lifting movement of the triggering rod caused by the compression spring triggers the gripping device. There is lifting unit that can move independently of the triggering element with which the triggering element is returned to the standby position from the second, triggered position, which enables an axial movement of the clamping slide and the second connecting element attached to the end thereof in relation to the triggering element within the retaining frame, such that when the first and second connecting elements interact, the triggering element can be returned from the triggered position to the standby position.

WO 2020/134225 A1 discloses another triggering mechanism for a gripping device that comprises a magnetically conductive frame surrounding a magnetic hollow chamber containing a permanent magnet that can move axially therein, which has a retaining rod extending axially from the hollow chamber that can be connected to a triggering rod on the gripping device. The magnetically conductive frame has a coil, first and second sides of which are adjacent to opposite ends of the magnet. When the coil is supplied with electricity, the magnet, and therefore the triggering rod attached thereto, are moved axially into a first standby position counter to the force of an external spring located between the triggering mechanism and the gripping device, thus opening the gripping device. If an abnormal state of the elevator car is detected, the supply of electricity to the coil is interrupted, resulting in the magnet located in the magnetic chamber moving to a triggering position for the gripping device as a result of the spring force.

Typical known solutions are structurally complex and/or require a great deal of maintenance. Based on the known prior art, the presently described technology relates to an improved triggering mechanism for a gripping device that addresses the disadvantages in the prior art and at least partially resolves them. In particular, a triggering mechanism is to be created that has a simple structural design and also effectively and reliably triggers a conventional gripping device without the necessity of incorporating a conventional mechanical speed regulator. The technology also addresses or resolves other problems that are discussed in the following description.

SUMMARY

The present disclosure relates to a triggering mechanism for a gripping device in an elevator system, in particular as a replacement for a conventional speed regulator, which comprises a supporting frame, an triggering element that can move axially inside the supporting frame, which has a triggering rod on one end that extends through an end of the supporting frame, which can be connected to the gripping device, a spring that applies a spring force to the triggering element when it is in at least one first standby position, and a magnetic retaining means that is designed to hold the triggering element in the standby position counter to the tension of the spring when supplied with electricity, in which the triggering element preferably forms a frame-like slide element, which has two guide strips extending in the axial direction of movement for guiding the slide element in the supporting frame, and one connecting strip that connects the guide strips at a right angle thereto on which the triggering rod is supported.

The assembly according to the present disclosure results in a structurally simple design for a device that is much more reliable than that in the prior art. The two lateral guide strips enable a longitudinal guidance of the triggering element within the supporting frame that prevents a tilting and/or canting thereof in the supporting frame. According to embodiments of the present disclosure, the frame-like structure results in a stable and balanced design, which minimizes undesired inertial effects during the triggering process in particular.

According to embodiments of the present disclosure, the guide strips preferably extend from the connecting strip in the direction opposite that in which the triggering rod extends. In other words, the guide strips preferably extend from a side of the connecting strip facing away from the triggering rod. The length of the guide strips in the direction of movement for the slide element is at least twice, preferably three times, and more preferably four times the width, or length, of the connecting strip. The length of the guide strips is preferably 1 to 20 cm, more preferably 2 to 15 cm.

According to embodiments of the present disclosure, the guide strips are advantageously supported in two opposite sides of the supporting frame. The guide strips can be supported by means of a tongue and groove connection in the supporting frame, such that they can move axially therein. By way of example, the guide strips can have ribs or tongues formed as integral parts thereon, which fit into corresponding longitudinal grooves in the supporting frame.

According to embodiments of the present disclosure, the magnetic retaining means are designed to retain the triggering element in the standby position counter to the spring tension when supplied with electricity. The standby position is understood to be the position in which the triggering element is not activated, i.e. in which the triggering mechanism does not trigger, or close, the gripping device connected thereto, such that the elevator can be operated. The retaining means are also designed to release the triggering element when the power supply thereto is interrupted, such that they then move from the standby position to the triggered position by the spring tension. This results in an axial lifting movement of the triggering rod, by means of which an activation lever for a brake device or brake unit in the gripping device connected thereto can be brought from an open position to a closed position or braking position. The brake device can clamp onto and/or engage with a guide rail in the known manner when triggered by the activation lever, such that the brake shoes in the brake device bear on, or clamp onto the guide rails.

According to embodiments of the present disclosure, when in the triggered state, the triggering element can then be returned from a triggered position to a standby position by the magnetic retaining means, such that the gripping device is opened, or the brake device in the gripping device can be released from a closed position. In an example embodiment, the triggering mechanism is preferably designed such that when the triggering element is returned form the triggered position to the standby position, it can still move toward the triggered position. Accordingly, the triggering element is not prevented from moving from the standby position to the triggered position, and/or from an intermediate position between the standby position and the triggered position to the triggered position even when returning the triggering element to the standby position if it is triggered again. Force applied to the triggering element to move or return it from the triggered position to the standby position still allows for axial freedom of movement of the triggering element between the standby position and the triggered position.

According to embodiments of the present disclosure, the triggering mechanism preferably has a control unit dedicated to the retaining means for activating the triggering mechanism and specifically the retaining means, or it is designed such that it can be connected to such a control unit for this.

According to embodiments of the present disclosure, the connecting strip is preferably designed to secure the triggering rod axially to the frame-like slide element. In such embodiments, the triggering rod is placed or supported on the connecting strip such that the triggering rod cannot move axially in relation to the slide element. Alternatively, the triggering rod can be supported in the connecting strip such that it can move axially to a limited extent.

According to embodiments of the present disclosure, the connecting strip preferably has an integrated bearing element in which an end section of the triggering rod is preferably supported such that it rotates and/or tilts to some extent. The triggering element can also be supported in the bearing element such that it can move radially to a limited extent. Unlike in typical solutions, in which the triggering rod is screwed into a corresponding counterpart, and thus cannot move, the design according to the present disclosure results in a significantly optimized support for the triggering rod with a predefined amount of play or freedom of movement. This results in a significantly more robust system, in particular with regard to its resilience when the triggering rod is subjected to radial and/or rotational forces, thus minimizing the maintenance requirements for the mechanism.

According to embodiments of the present disclosure, the bearing element is preferably formed by a hole and/or projection in the connecting strip, which engages with a preferably circumferential groove in the outer surface of the end section of the triggering rod. In an example embodiment, the bearing element can have a hole with a variable inner diameter, in which a first part of the hole has a larger inner diameter for receiving and/or at least partially inserting the triggering rod, and a second part of the hole can have a smaller inner diameter in which the triggering rod is axially secured in place.

According to embodiments of the present disclosure, the triggering rod is also preferably inserted through a hole or a preferably round bore in the end section of the supporting frame. This hole can form an axial support and/or a enable a predefined radial freedom of movement for the triggering rod in the end section of the supporting frame.

According to embodiments of the present disclosure, the slide element also has frame strip at the rear that is parallel to the connecting strip on a side facing away from the triggering rod. The frame strip is orthogonal to the guide strips when looking down onto the slide element.

According to embodiments of the present disclosure, the slide element is preferably a frame element that is snapped together. In such embodiments, the slide frame is not assembled with screws and/or adhesive. This results in a very resilient design of the frame element, which can further reduce the maintenance requirements. The individual frame parts are snapped together in this case, with projections, recesses and/or holes. By way of example, the guide strips in the slide element can each have opposing holes into which projections on the connecting strip and the rear frame strip engage.

According to embodiments of the present disclosure, the spring elements in the triggering mechanism preferably comprise two compression springs on the sides of the frame-like slide element. Unlike in the prior art, in which there is a central spring that is coaxial to the triggering rod, this results in a more robust triggering element, that moves more reliably. Furthermore, relatively long springs can be used as a result of the lateral placement, thus increasing the reliability and reducing the risk of breaking a spring. Moreover, the use of compression springs ensures a reliable functioning of the triggering mechanism, even if one of the springs breaks. The compression springs are placed such that they extend between an end section of the supporting frame facing the gripping device and an end section of the slide element facing away from the gripping device.

According to embodiments of the present disclosure, the guide strips and/or the rear frame strip can have stop elements for the spring elements that protrude laterally. In an example embodiment, projections on the rear frame strip that engage in holes in the guide strips form the lateral stop elements.

According to embodiments of the present disclosure, the magnetic retaining means preferably comprise two electromagnets placed between the triggering element and a side of the supporting frame facing the gripping device, which exert a retaining force on the connecting strip in the triggering element when supplied with electricity. In such embodiments, the triggering mechanism preferably comprises clamping slide that can move axially, independently of the triggering element, with the electromagnets located in the first end section thereof, which is designed to return the triggering element from a triggered position to the standby position. The clamping slide is preferably supported on both sides in the supporting frame by guide strips or the like, such that it can move.

In another example embodiment, the magnetic retaining means preferably comprise two coils fixed opposite one another in the supporting frame, which interact with a permanent magnet on the triggering element lying therebetween. The coils and the permanent magnet are designed and placed such that the coils enable an axial movement of the permanent magnet, and therefore the triggering element, in the direction opposite the spring force, when supplied with electricity, as well as retaining the triggering element in the standby position. The permanent magnet is preferably attached to the triggering element by fastening means intended for this, such that it remains stationary thereon. The orientation of the poles of the permanent magnet is preferably at a right angle to the winding direction of the coils. As soon as the power supply to the coils is interrupted, in particular if an abnormal operating state of the elevator car is detected, the retaining force applied to the triggering element by the coils is terminated, and the triggering element moves into the triggered position. It is returned to the standby position when power is returned to the coils.

According to embodiments of the present disclosure, the triggering mechanism comprises position detection sensors with which the axial position of the moving triggering element and/or a moving clamping slide in the supporting frame can be detected on a continuous basis. As a result, the current or actual positions of the moving components in the triggering mechanism can be detected, such that the individual components, and in particular the retaining means, can be controlled in an optimized manner. In an alternative embodiment, the position detection sensors preferably comprises numerous Hall sensors placed along the direction in which the moving components move, e.g. in or on a dedicated cover or housing element for the triggering mechanism, which interact with magnetic position markers placed on the moving components.

Another aspect of the technology relates to a gripping device comprising a brake device in or on a guide rail for an elevator car, and an activation lever connected thereto, which can preferably rotate at least in part, for triggering the brake device, and a triggering mechanism connected to the activation lever, such as that described above.

The gripping device can be attached to an elevator car in the known manner. The triggering mechanism is preferably substantially parallel to the longitudinal extension of the guide rails for the elevator car with respect to the alignment of the direction of movement for the triggering rod. The activation lever can preferably be at a right angle to the direction of movement for the triggering rod, and it can be supported in an articulated manner at a first end section on the elevator car, and connected at a second end section, opposite thereof, to the brake device or brake unit. The triggering rod is therefore connected at an intermediate point between the joint and the brake device such that an axial movement of the triggering rod results in a rotation of the activation lever about the joint.

At the connecting point between the triggering rod and the activation lever, the triggering rod have an oblong hole extending in the direction of movement, in which a bolt or locking pin for the activation lever is supported such that it can move at least to some extent. The oblong hole can advantageously be designed and located such that when the triggering mechanism is in a standby position, the bolt bears on an end stop in the oblong hole, such that a triggering of the triggering element results in a direct transfer of force to the activation lever. When the triggering element is returned, the triggering rod can be moved through the oblong hole, at least partially independently of the activation lever, resulting in an optimized release of the gripping device.

According to embodiments of the present disclosure, the gripping device comprises a deflector unit designed to convert an axial movement of the triggering rod into a rotation of a connecting rod in the gripping device, in which the connecting rod is also advantageously designed to connect at least two brake devices to the triggering device. The connecting rod can have a square profile for this, to which a respective activation lever for a brake device can be connected at one end directly. In such embodiments, the activation lever is preferably not also connected at a joint to the elevator car or a retaining structure thereon, and instead, a rotation of the connecting rod is transferred directly and preferably without transformation to the activation lever. At least two brake devices or brake units can preferably be connected by the deflector unit to a triggering mechanism.

According to embodiments of the present disclosure, the gripping device therefore preferably comprises at least two brake devices or brake units according to the presently disclosed technology, each of which has a dedicated activation lever connected to a single, shared triggering mechanism. This significantly reduces the risk of a canting of the elevator car in the guide system or elevator shaft when the gripping device is triggered, in particular because, unlike in the prior art, there is no need for two separate triggering mechanisms on the car, with which there is a higher chance that they will not trigger simultaneously, such that the car might be tilted.

According to embodiments of the present disclosure, the deflector unit is also preferably designed such that the triggering mechanism can be mounted substantially horizontally on the elevator car. In such embodiments, the triggering mechanism is placed on the elevator car such that the axial direction of movement of the triggering element is substantially horizontal. This minimizes the effects of external acceleration forces, in particular in an abnormal system state, which could counteract a triggering of the mechanism. As a result, the necessary retaining and triggering forces for the triggering mechanism can be somewhat weaker or lower, resulting in a less expensive and more energy-efficient construction.

In example embodiments, the gripping device is also designed to decelerate the elevator car in a first and second direction of movement or acceleration.

According to embodiments of the present disclosure, the triggering mechanism comprises a guide cage on the triggering rod that has a bearing surface facing the triggering mechanism, the housing, or the supporting frame for the mechanism, and a rotating element supported therein, in particular a knurled wheel, which can be connected to an activation lever for the brake device. In an example embodiment, the rotating element and the guide cage are preferably placed and designed such that a guide rail for the elevator can be placed or guided between the bearing surface and an end section of the supporting frame for the triggering mechanism. In another example embodiment, the rotating element and guide cage are placed and designed such that the rotating element presses against a guide rail for the elevator car when the triggering mechanism is triggered, and rolls against it in a direction substantially orthogonal to a direction of extension or movement for the triggering rod, and/or such that the rotating element is clamped between the bearing surface and the guide rail.

According to embodiments of the present disclosure, the guide cage at least partially enables a movement of the rotating element in a direction orthogonal to the direction of movement for the triggering rod within predefined limits. In such embodiment, the guide cage can have an upper and lower stop, or a movement limiter, which limits the movement of the rotating element orthogonally to the axial direction of movement for the triggering rod within a predefined range. By way of example, the guide cage can have a substantially concave bearing surface, which is tilted or tapered toward the guide rail on both sides, or above and below, from a neutral position of the rotating element.

The design according to the present disclosure makes it possible to create a triggering mechanism that can be triggered when the elevator car is moving in either direction, i.e. when the elevator car is inadvertently accelerated upward or downward. Instead of at least two triggering mechanisms, one for each of the possible inadvertent directions of acceleration for the elevator car, only one triggering mechanism is needed, which functions in both directions.

In such embodiment, the rotating element, or knurled wheel is preferably connected directly to the activation lever for the brake device, in particular at an axis of rotation for the rotating element.

In another example embodiment, the triggering mechanism can preferably be placed horizontally on the elevator car in relation to the axial direction of movement for the triggering rod. The direction of movement for the triggering rod in the triggering mechanism is or can be substantially orthogonal to the guide rails for the elevator car.

According to embodiments of the present disclosure another aspect of the present technology relates to an elevator system that has an elevator car in an elevator shaft and a triggering mechanism and/or gripping device such as those described above. The elevator system comprises substantially vertical guide rails for the elevator car with which a brake device in the gripping device comes in contact. The elevator system also comprises a control unit designed to activate the triggering mechanism when the elevator system is in an abnormal operating state.

BRIEF DESCRIPTION OF THE DRAWINGS

Particulars, further effects, and details of the present disclosure shall be explained in greater detail below in reference to the schematic, merely exemplary drawings. Therein.

DESCRIPTION

Figure 1:
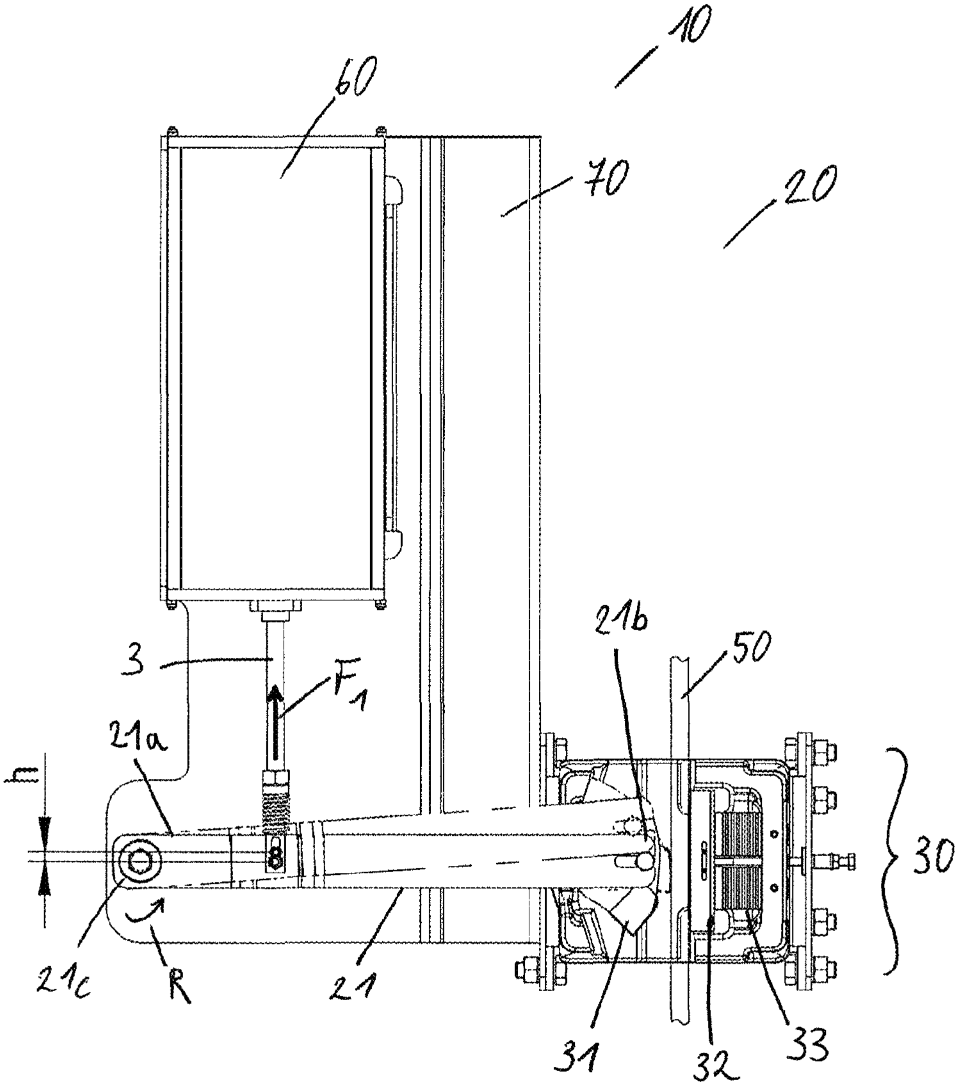
FIG. 1 illustrates a side view of a preferred embodiment of the triggering mechanism according to the present disclosure.

FIG. 1 shows a side view of an example embodiment of the triggering mechanism 10 for a gripping device 20. The triggering device 10 comprises a preferably oblong housing 60 that has a triggering rod 3 extending axially therefrom for a triggering element 2, which is described in greater detail below. The triggering mechanism 10 and the gripping device 20 that contains it are attached in the conventional manner to a part of the elevator car 70 or a mount attached thereto. The triggering mechanism 10 in this embodiment is placed vertically on the elevator car 70 with respect to an axial direction of movement for the triggering rod 3. The triggering rod 3 is connected to a brake device or brake unit 30 by an activation lever 21. The activation lever 21 is connected in an articulated manner at a first end 21*a* to the car 70, and to a preferably swivel-mounted brake shoe 31 in the brake unit 30 at the other end. The brake unit 30 is place on or in a stationary guide rail 50 for the elevator car, or the elevator system, and exerts a braking force on the guide rail 50 when the gripping device is triggered.

If the triggering mechanism is triggered, the triggering rod 3 moves in the axial direction F1, which results in a rotational movement R of the activation lever 21 about the joint 21*c* through the connection of the triggering rod 3 to the activation lever 21 at a point lying between the first and second ends 21*a*, 21*b*. A lifting h of the triggering rod is preferably up to 50 mm, particularly advantageously between 10 mm and 20 mm.

As indicated by the broken line in FIG. 1, this results in a pivoting of the brake shoe 31 from a neutral position to a braking position, in which it bears against the guide rail 50. This is then pressed against an opposing brake pad 31. The pressure, and thus the desired deceleration when braking, can be set with a dedicated spring assembly 33 (cf. the detail view in FIG. 6).

FIGS. 2*a-d* show perspective side views of an example embodiment of the triggering mechanism 10 in different operating states.

The triggering mechanism 10 comprises a supporting frame 1 that has a first end section 1*a* and an opposing second end section 1*b*. A slide element forming the triggering element 2 is supported in the supporting frame 1 such that it can move axially, and the triggering rod 3 on the end of the triggering element 2 extends through the end section 1*a* of the supporting frame 1. This end section 1*a* has a hole 1*c* for this that serves as an axial support for the triggering rod 3.

Figure 2A:
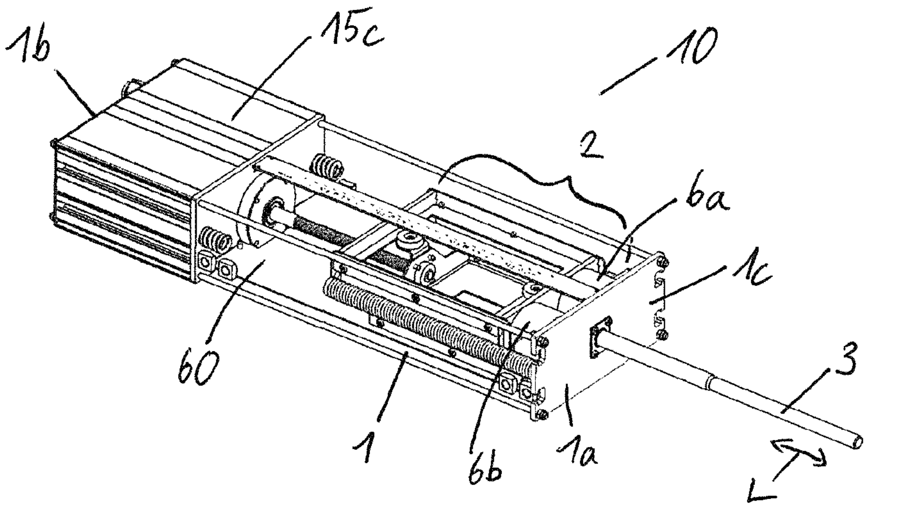
FIGS. 2*a-d* illustrate perspective side views of a preferred embodiment of the triggering mechanism in different operating states.
Figure 2B:
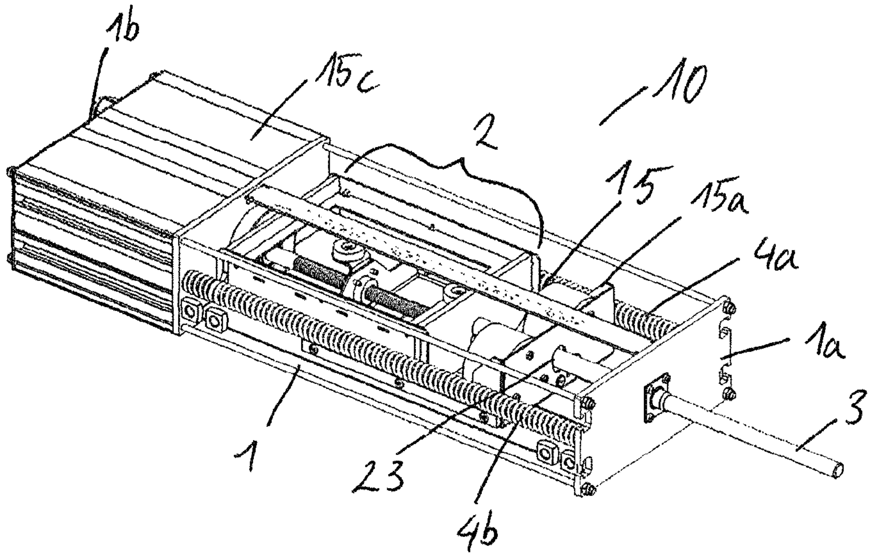
Figure 2C:
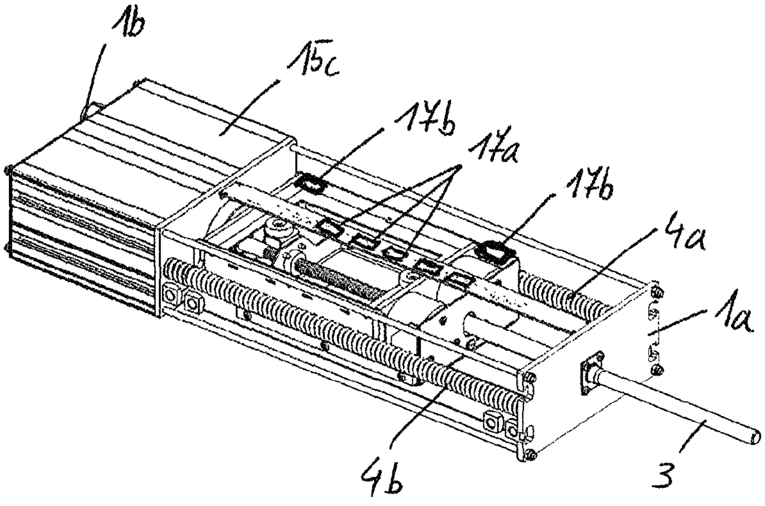

The slide element 2 can move in this case at least between a standby position H (FIG. 2*a*) from where it can be triggered, and a triggered position A (FIGS. 2*b*, 2*c*). Springs 4*a*, 4*b* are placed on the sides between the end section 1*a* and the triggering element 2 that exert a spring force on the slide element 2 in a direction counter to that in which the triggering rod 3 extends.

In the standby position H, the slide element 2 is held in place by retaining means 6*a*, 6*b* located between the end section 1*a* of the supporting frame 1 and the slide element 2. In this embodiment, the retaining means 6*a*, 6*b* are formed by electromagnets which act magnetically on the slide element 2 when supplied with electricity, counter to the spring forces of the springs 4*a*, 4*b*. When in the standby position H, this magnetic force is greater that the spring force of the springs 4*a*, 4*b*.

As soon as a control unit (not shown) that is connected to or integrated in the triggering mechanism receives a triggering signal, the power supply to the retaining means 6*a*, 6*b* is interrupted, resulting in the slide element 2 moving from the standby position H shown in FIG. 2*a* to the triggered position A shown in FIG. 2*b*. The triggered position is preferably not delimited by a rear stop in the supporting frame. In such example embodiment, the supporting frame 1 is preferably designed such that there is enough axial freedom of movement for the triggering element, or slide element 2, to ensure a reliable triggering and the necessary lifting associated therewith.

To return the slide element 2, the triggering mechanism 10 in this exemplary embodiment comprises a clamping slide 15 that can move axially independently of the triggering element 2. This has a first end section 15*a* in which the magnetic retaining means 6*a*, 6*b* are located. The end section 15*a* also has a cut-out or hole 24 through which the triggering rod 3 can be inserted, without coming in contact therewith. The other end section 15*b* is preferably connected to a drive, e.g. a spindle motor 15*c*. The clamping slide 15 is such that it can move axially in the supporting frame 1, parallel to the slide element 2, and is designed to return the triggering element 2 from a triggered position A, shown in FIG. 2*b*, to the standby position H by interacting with the magnetic retaining means 6*a*, 6*b*.

Figure 2D:
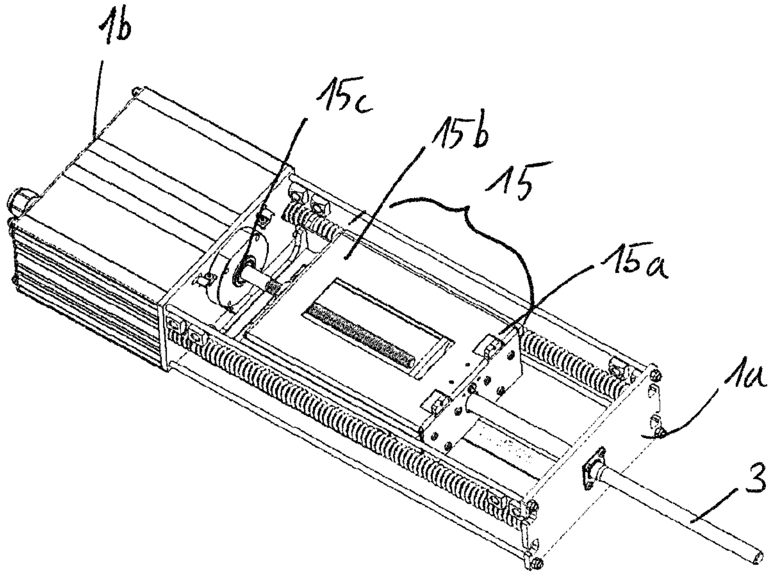

The clamping slide 15 is moved with the drive 15*c* by a dedicated control unit from the initial end position in the supporting frame, shown in FIG. 2*a*, toward the triggering element 2 in the triggered position (cv. Intermediate position, FIG. 2*b*), preferably until the retaining means 6*a*, 6*b* in the clamping slide 15 come in contact with triggering element 2, or are at least adjacent thereto (cf. FIGS. 2*c*, 2*d*). FIG. 2*d* shows a rear view of the triggering mechanism 10 in which the triggering element 2 is in the triggered position and the clamping slide 15 has been move toward, or is in contact with, the triggering element 2.

The retaining means 6*a*, 6*b* are then supplied with electricity, such that a magnetic force acts on the triggering means. The clamping slide 15 is then returned by the drive 15*c* to the initial end position in the supporting frame 1, during which the magnetic force draws the triggering element 2 into its standby position, as shown in FIG. 2*a*.

During the return process described above, the clamping slide 15 always moves along a side of the triggering element 2 facing the triggering rod 3, such that a rearward area is not blocked or hidden by the clamping slide. As a result, even when resetting the triggering element, it can always be ensured that the triggering mechanism will function correctly.

The triggering mechanism 10 can also contain position detection sensors 17 with which the axial positions of the triggering element 2 and/or the clamping slide 15 in the supporting frame 1 can be continuously monitored. The position detection sensors can comprise numerous sensors 17*a*, preferably in a series, in or on the supporting frame 1 or housing 60, e.g. Hall sensors, as shown by way of example in FIG. 2*c*. The Hall sensors can detect magnetic markers 17*b* located on the triggering element 2 and/or clamping slide 15 in order to determine the respective axial positions of the components along their movement paths.

Figure 3:
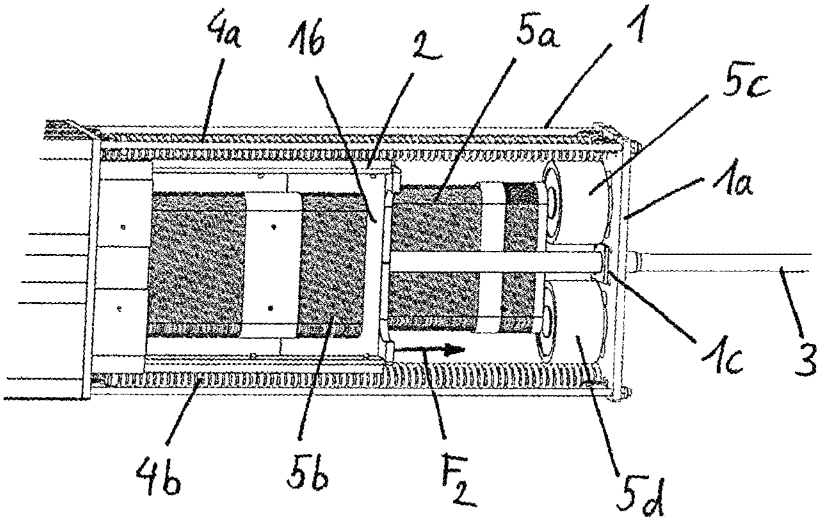
FIG. 3 illustrates a perspective side view of another preferred embodiment of the triggering mechanism.

FIG. 3 shows a perspective side view of another example embodiment of the triggering mechanism 10 in which the housing 60 is omitted for purposes of clarity. FIG. 3 shows an embodiment in which the magnetic retaining means comprise two stationary coils 5*a*, 5*b* lying opposite one another in the supporting frame 1, in which the front coil in FIG. 3 is shown in a cutaway view for purposes of clarity. The coils 5*a*, 5*b* are parallel to one another and preferably extend over the entire length of the supporting frame 1. The triggering element 2 is located between the coils 5*a*, 5*b*, and there is at least one permanent magnet 16 located thereon. The coils 5*a*, 5*b* and the magnet 16 are placed and designed such that when electricity is supplied to the coils 5*a*, 5*b*, the triggering element 2 can move counter to the spring force of the springs 4*a*, 4*b*, and the triggering element 2 can be held in place in a standby position H.

The position shown in FIG. 3 corresponds to a triggered position of the triggering element 2. To return it to the standby position, the coils 5*a*, 5*b* are supplied with electricity, such that the triggering element 2 is moved toward the end section 1*a* of the supporting frame 1 (axial movement F2). As long as electricity is supplied to the coils 5*a*, 5*b*, the triggering element 2 can be held in place in the standby position, counter to the spring force of the springs 4*a*, 4*b*. The mechanism can also have one or two electromagnets 5*c*, 5*d* located at the end 1*a* of the supporting frame 1, which can also be supplied with electricity in order to hold the triggering element 2 in the standby position.

Figure 4A:
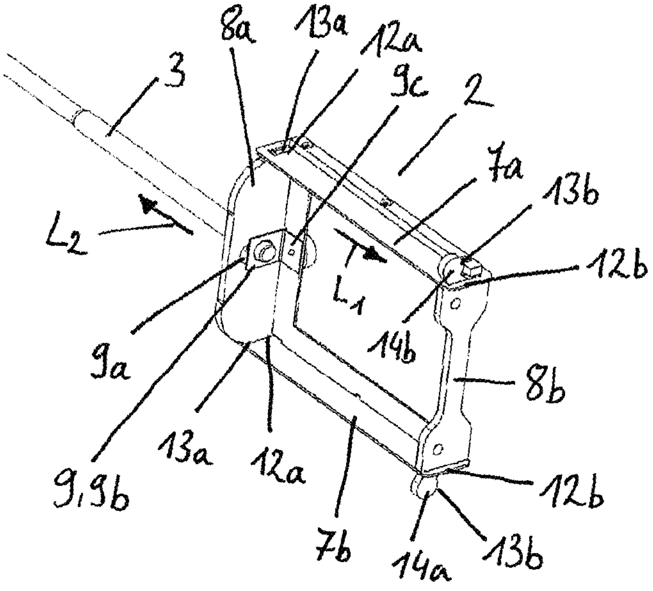
FIGS. 4*a, b* illustrate perspective side views of an embodiment of the slide unit according to the present disclosure.

FIGS. 4*a, b* show another example embodiment of the triggering or slide element 2 according to the present disclosure, for the mechanism shown in FIGS. 2*a*-2*d*. In such example embodiment, the slide element 2 is preferably designed as a frame-like slide element, which has two guide strips 7*a*, 7*b* extending in the direction of movement in which the slide element 2 is guided in the supporting frame 1, and an orthogonal connecting strip 8*a* on which the triggering rod 3 is supported. The guide strips 7*a*, 7*b* extend from the connecting rod 8*a* in a direction L1, counter to the direction of extension L2 for the triggering rod 3. There is a rear frame strip 8*b*, parallel to the connecting strip 8*a*, on a side facing away from the triggering rod 3.

In another example embodiment, the slide element 2 is preferably a frame element that snaps together, in which the individual strips 7*a*, 7*b*, 8*a*, 8*b* are snapped together with projections, recesses, and/or holes. The guide strips 7*a*, 7*b* on the slide element 2 can have opposing recesses 12*a*, 12*b*, for example, into which projections 13*a*, 13*b* on the connecting strips 8*a* and the rear frame strip 8*b* engage.

In an example embodiment, the connecting strip 8*a* comprises an integrated bearing element 9 in which an end section 3*a* of the triggering rod 3 is preferably supported such that it can rotate, move radially, and/or tilt, at least to some extent. The bearing element 9 can be a hole in the connecting strip 8*a*, which engages in a preferably circumferential groove 11 on the outer surface of the end section 3*a* of the triggering rod 3. The bearing element 9 can also be a hole with a variable inner diameter, in which a first part 9*a* of the hole has an inner diameter through which the triggering rod 3 can be inserted, and a second part 9 of the hole has a smaller inner diameter, in which the triggering rod 3 is fixed in place axially. The triggering rod 3 can be held in place in the bearing element 9 by a corresponding securing element 9*c* in the smaller part 9*b* of the hole 9.

Figure 4B:
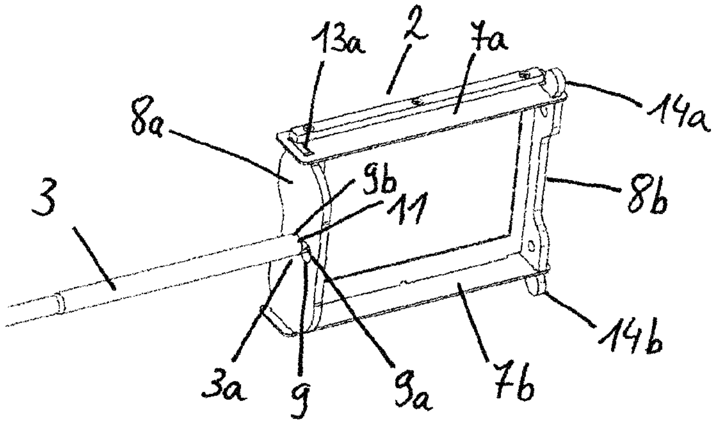
Figure 5A:
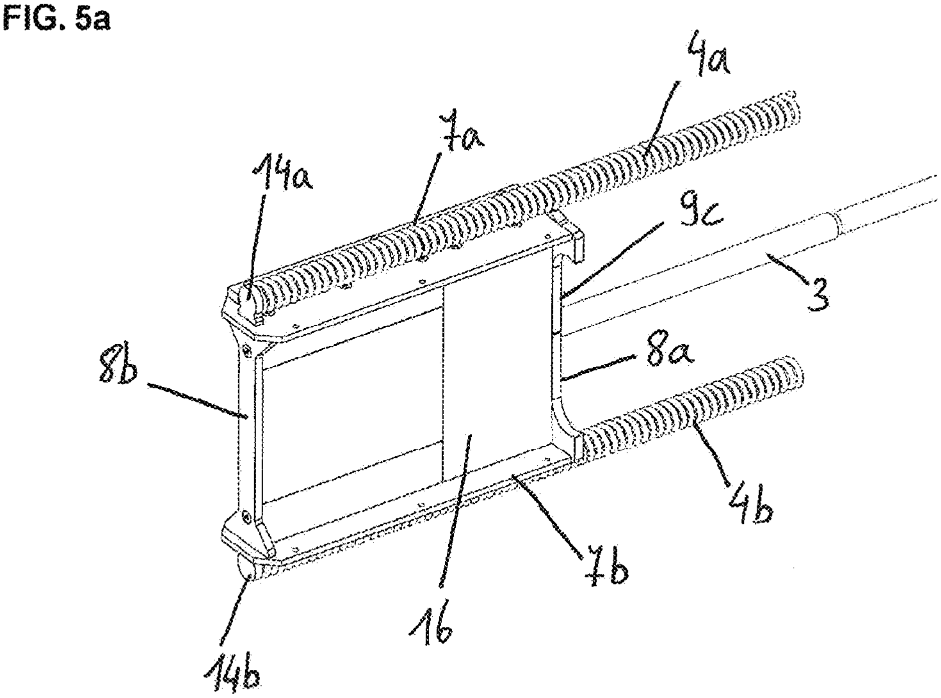
FIGS. 5*a, b* illustrate perspective side views of another embodiment of the slide unit according to the present disclosure.
Figure 5B:
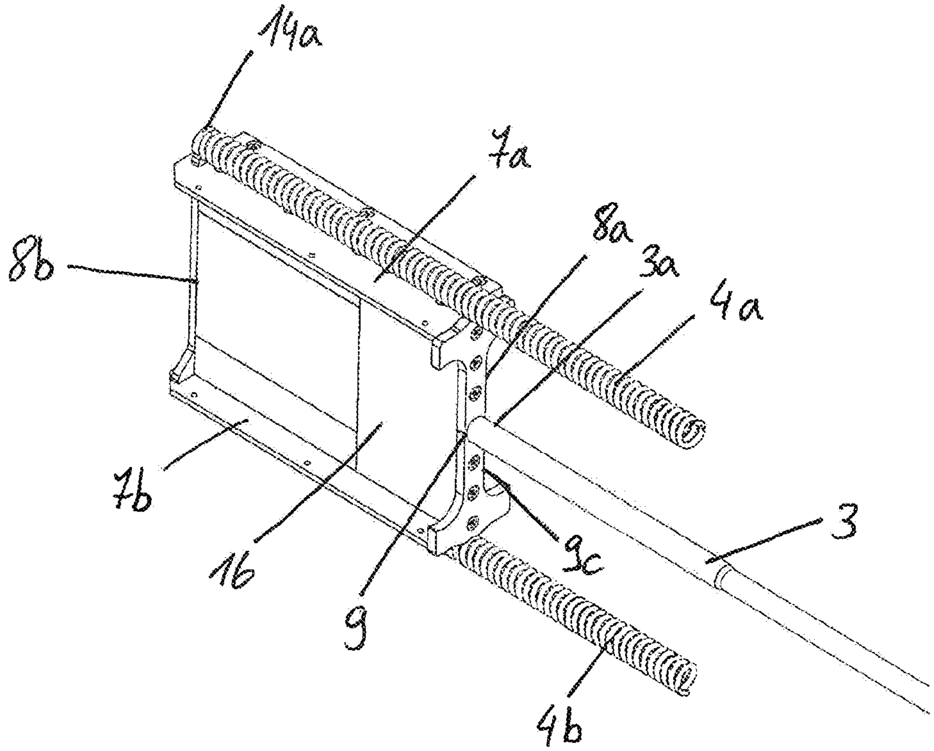

The guide strips 7*a*, 7*b* and/or the rear frame strip 8*b* can have stop elements 14*a*, 14*b* that extend laterally, against which the springs 4*a*, 4*b* bear. FIGS. 5*a, b* show another example embodiment of the slide element 2 according to the present disclosure for the mechanism shown in FIG. 3. The slide element is similar to that shown in FIGS. 4*a*, 4*b*, but also contains at least one permanent magnet 16 in the middle, which interacts with the coils 5*a*, 5*b* in the retaining means.

The bearing element 9 in this embodiment can comprise a hole into which an end section 3*a* of the triggering rod 3 can be inserted. The securing element 9*c* can be a two-piece cover strip, which can be fastened to the connecting strip 8*a* at different positions, such that two semicircular cut-outs engage in a groove 11 on the outer surface of the end section 3*a* of the triggering rod 3 from opposite sides.

Figure 6:
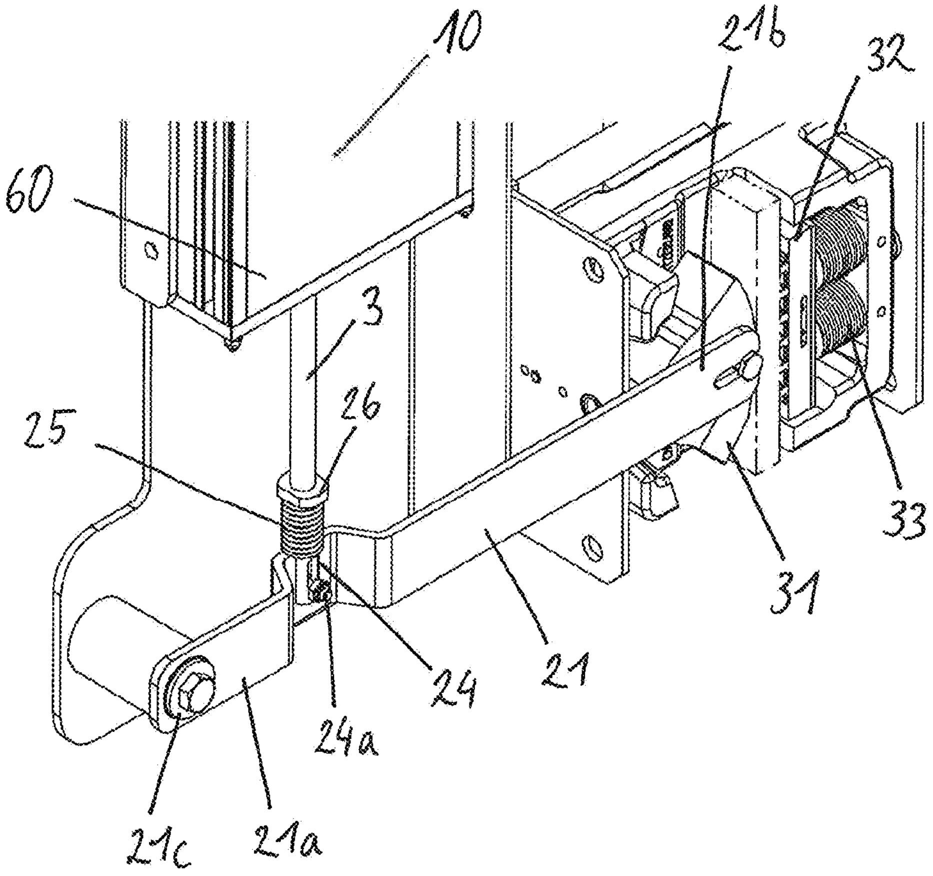
FIG. 6 illustrates a detail view of an embodiment for connection of the triggering mechanism to a brake unit in the gripping device according to the present disclosure.

FIG. 6 shows a detail view of an example embodiment of the connection between the triggering mechanism 10 and a brake unit 30 in the gripping device 20. As shown here, the triggering rod 3 can have an oblong hole 24 extending in the direction of movement where it is connected to the activation lever 21, in which a bolt 24*a* for the activation lever 21 is inserted such that it can move at least to some extent.

The oblong hole 24 can be placed such that the bolt bears on a lower end stop in the oblong hole 24 when the triggering mechanism 10 is in the standby position, such that when the triggering mechanism 10 is triggered, force is exerted directly on the activation lever 21. When resetting the triggering element 2, the triggering rod 3 can be moved through the oblong hole 24, at least partially independently of the activation lever 21. The extent of the possible movement of the bolt 24*a* in the oblong hole 24 can be set by of a spring element 25 dedicated to the triggering mechanism 10 and an associated setscrew 26.

Figure 7A:
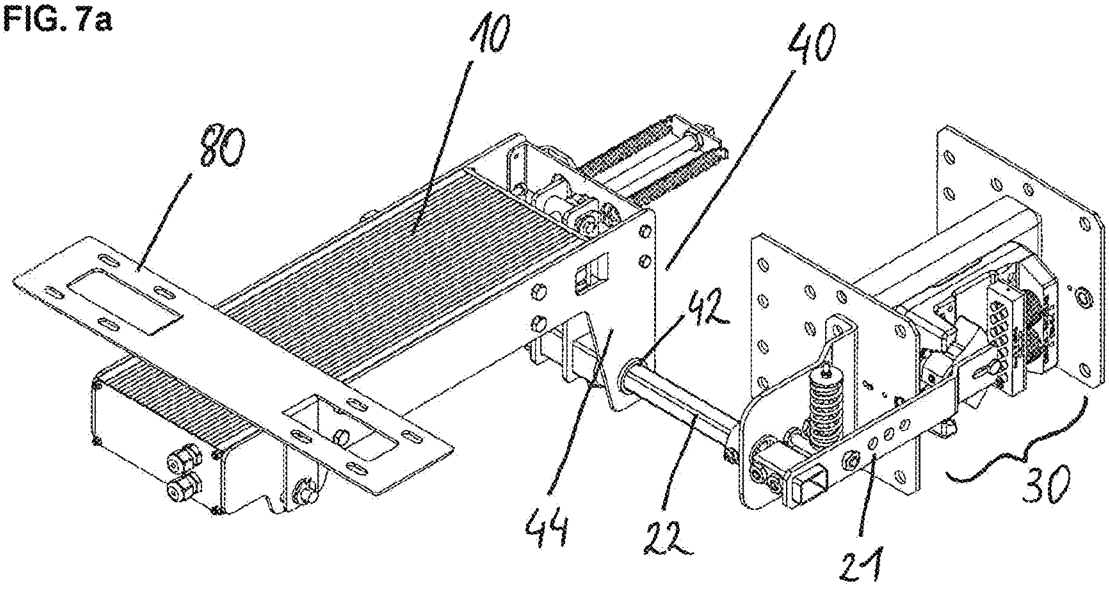
FIGS. 7*a-c* illustrate different views of another embodiment of the gripping device according to the present disclosure.
Figure 7B:
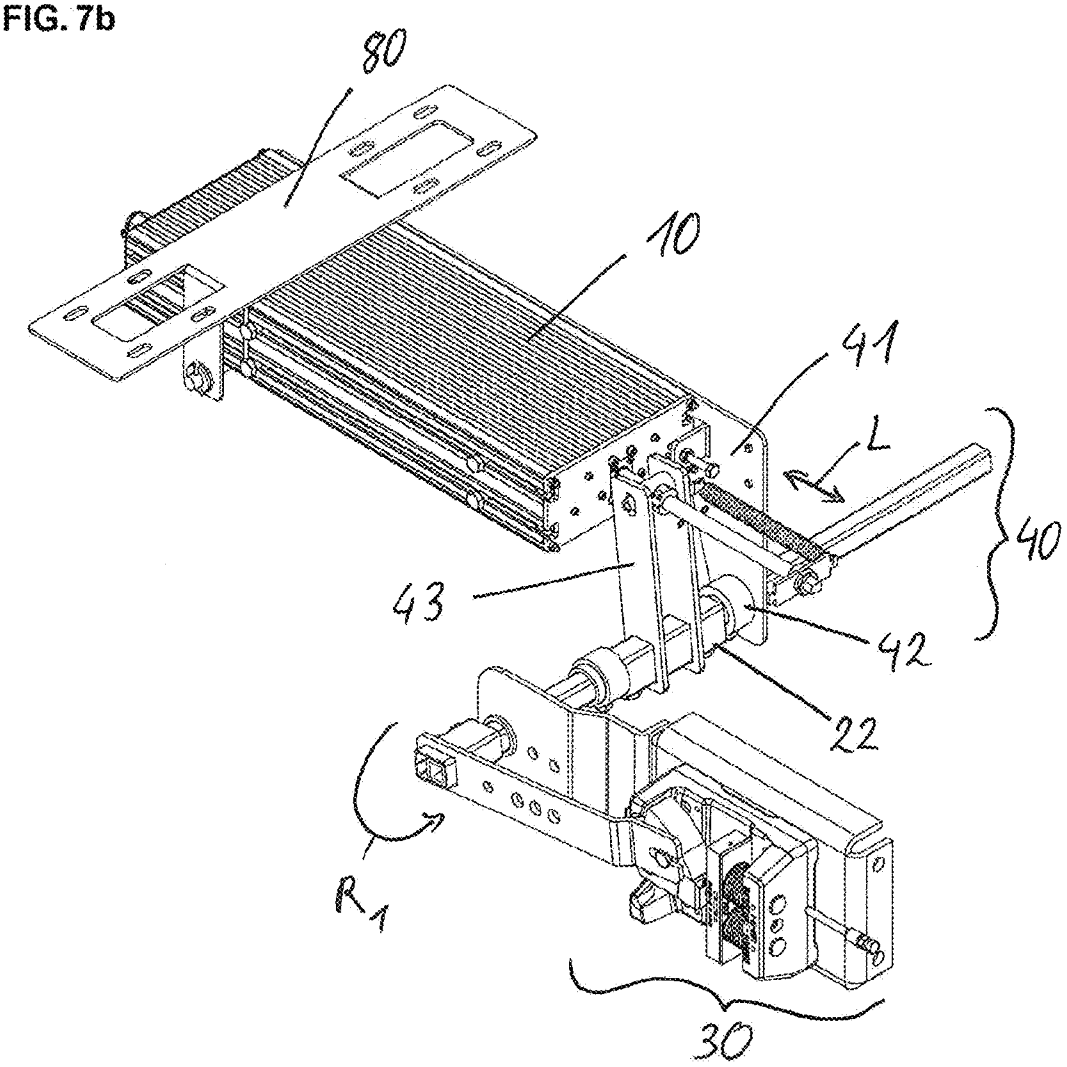
Figure 7C:
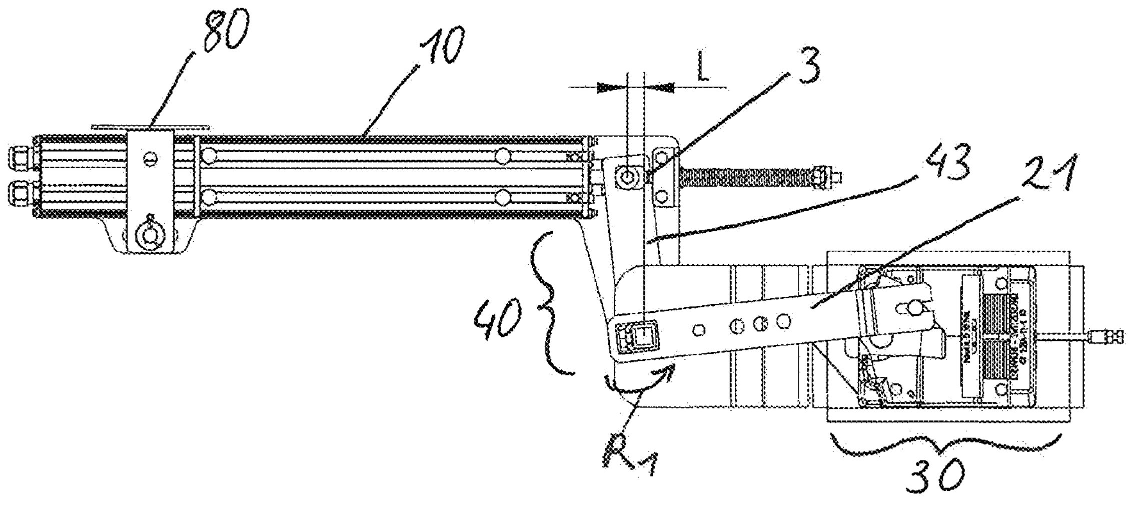

FIGS. 7*a-c* show different views of another example embodiment of the gripping device 20 according to the present disclosure.

The gripping device 20 is attached horizontally to an elevator car (not shown), either directly or with corresponding fastening means, or a mount 80. The gripping device 20 comprises a deflector unit 40 designed to convert an axial movement L of the triggering rod 3 into a rotation R1 of a connecting rod 22 in the gripping device 20 (cf. FIGS. 7*b*, 7*c*). The connecting rod 22 is designed to connect at least two brake devices 30 to a single triggering mechanism 10.

The deflector unit 40 can contain an L-shaped bearing element 41 that extends toward the triggering rod 3 and orthogonally thereto, and has at least one bearing point 42 in which the connecting rod 22 is rotationally supported such that the connecting rod 22 extends orthogonally to the longitudinal extension of the triggering rod 3. The deflector unit 40 also preferably has a lever element 43, rigidly connected to the connecting rod 22, which converts an axial movement of the triggering rod 3 into a rotational movement of the connecting rod 22. The lever element 43 is connected in an articulated manner to the triggering rod 3.

The connecting rod 22 can have a square profile to which a respective activation lever 21 for a brake device 30 can be connected directly at one end. The deflection unit 40 makes it possible to connect preferably at least two brake devices or brake units 30 to a single triggering mechanism 10.

The example embodiment as shown in FIGS. 7*a-c* results in a particularly space-saving assembly or embodiment of the gripping device 20. The gripping device 20 can be placed, preferably in the middle, on the upper and/or lower surface of the elevator car (not shown). The deflector unit 40 results in a space-saving assembly of the gripping device 20 at the level of the base of the elevator car, e.g. parallel to the floor thereof, such that it extends only slightly beyond the base of the elevator car in very narrow elevator shafts, or can be used in narrow elevator shafts without having to substantially reduce or further limit the dimensions of the base of the elevator car in order to fit the gripping device into the elevator shaft.

Figure 8A:
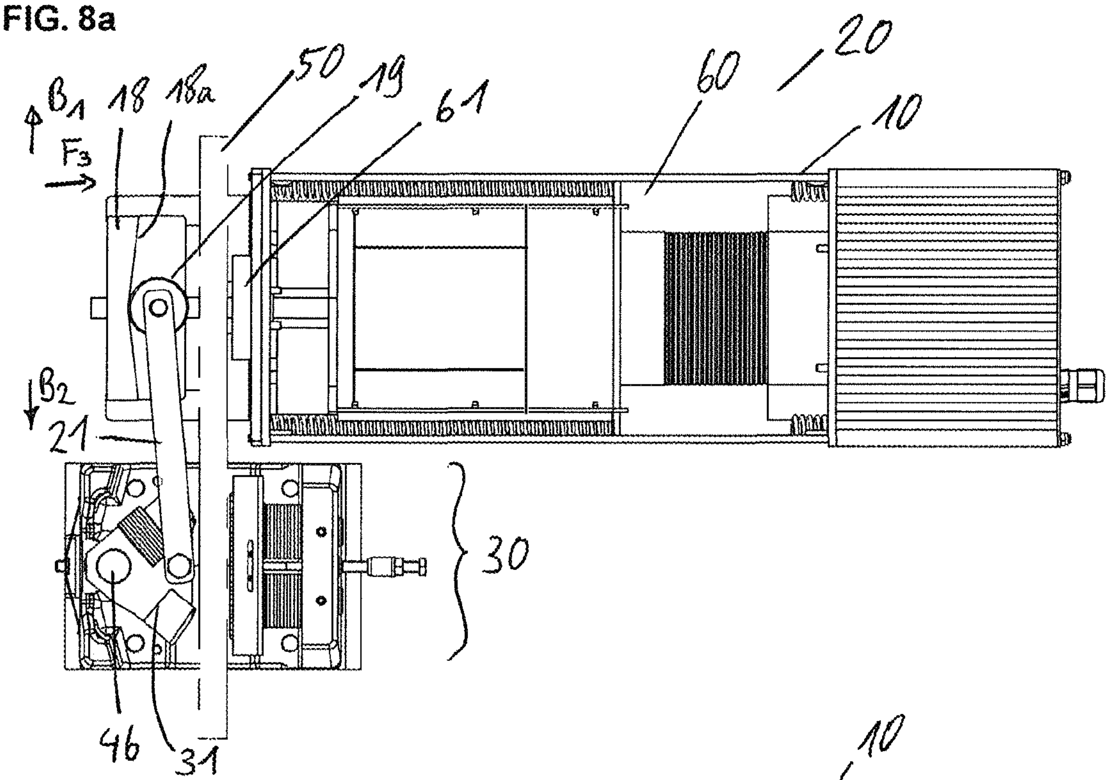
FIGS. 8*a-c* illustrate different views of an embodiment of the dual-functioning gripping device according to the present disclosure.
Figure 8B:
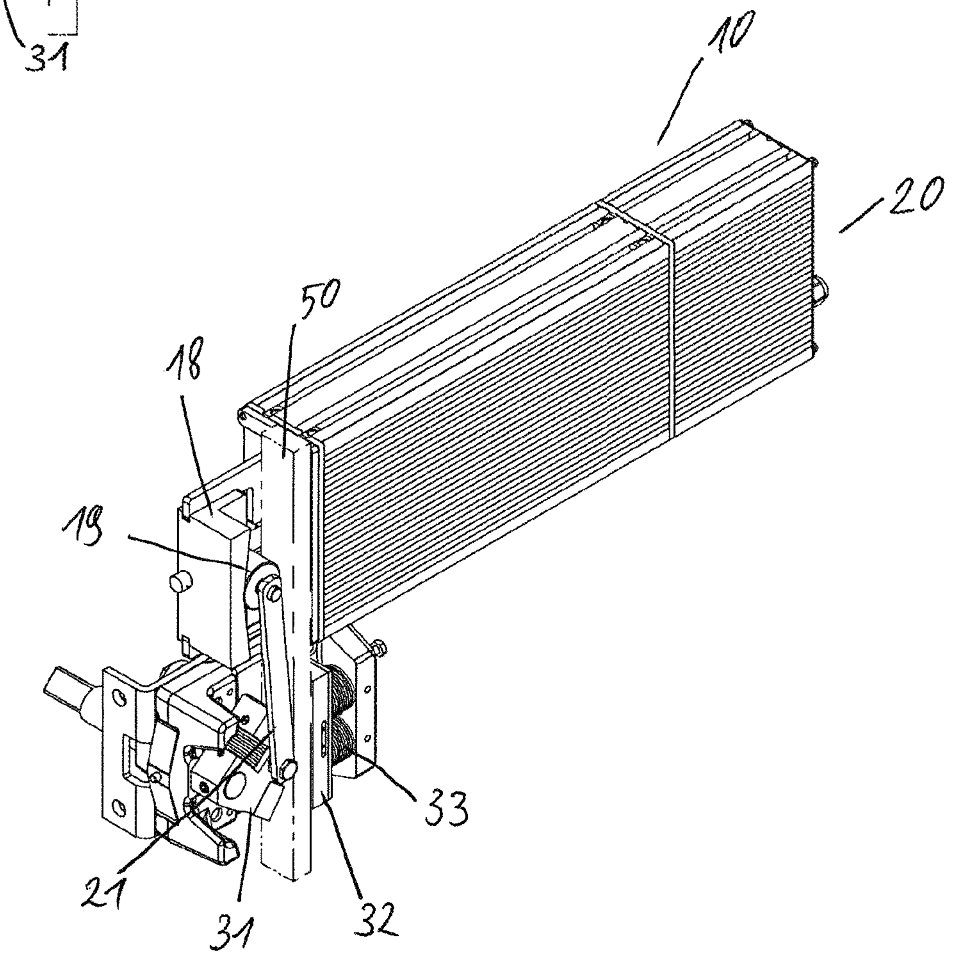
Figure 8C:
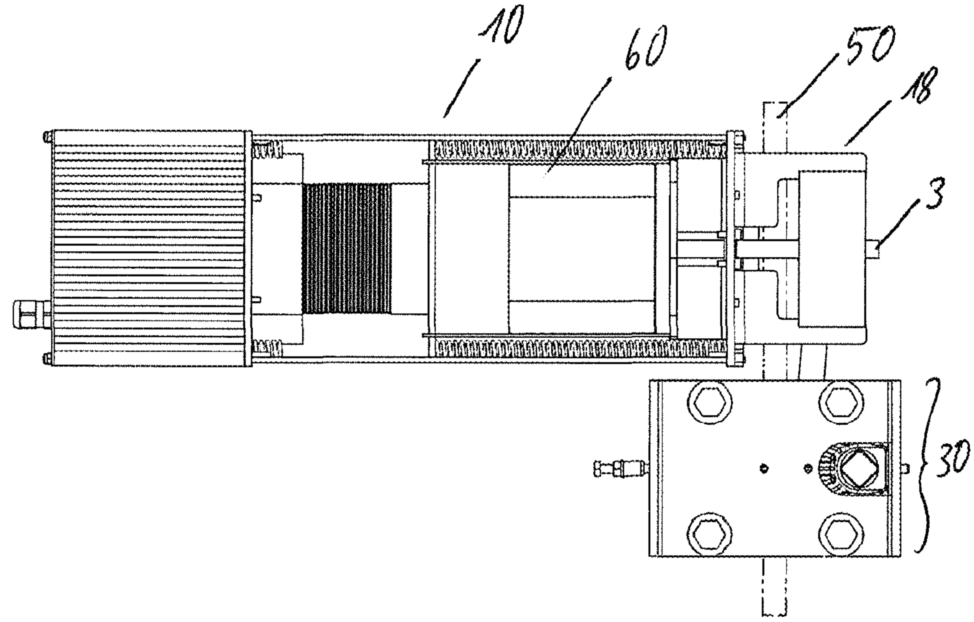

FIGS. 8*a-c* show different views of an example embodiment of the dual-functioning gripping device 20 according to the present disclosure. This differs from the embodiments described above in that this is designed to brake an elevator car 70 connected thereto in a first and second, opposite, direction of movement B1, B2.

The gripping device 20 comprises a triggering device 10, preferably such as that described above, which has a guide cage 18 with a bearing surface 18*a* facing the triggering mechanism 10, and a rotating element 19 supported therein, in particular a knurled wheel, which can be connected to an activation lever 21 for the associated brake device 30. A guide rail 50 for the elevator or elevator car is located between the guide cage 18 and a housing 60 for the triggering mechanism 10. In other words, the guide rail 50 is sandwiched between the housing 60 for the triggering mechanism 10 and the guide cage 18. A sliding component 61 or counterpressure element can be placed on the housing 60 for the triggering mechanism 10 at an end section 1*a* thereof.

In such example embodiment, the guide cage 18 is preferably secured in place on the triggering rod 3. When the triggering mechanism 10 is triggered, the guide cage 18 is moved toward the housing 60 in the direction of movement F3, such that the rotating element 19 is pressed against the guide rail 50 for the elevator and rolls over it. This results in the rotating element 18 rolls up or down on the bearing surface 18*a*, depending on the relative movement between the guide rail 50 and the rotating element, and thus in a direction substantially orthogonal to the axial direction of movement F3 of the triggering rod 3. The bearing surface 18*a* can be designed such that it tapers upward and downward in relation to the guide rail 50 it bears on, such that an increased pressure can be exerted by the rotating element 19 onto the guide rail 50.

The movement of the rotating element 19 at a right angle to the longitudinal extension of the triggering mechanism 10 triggered in this manner is transferred to a brake unit 30 connected thereto by an activation lever 21 attached to the rotating element 19, resulting in the swivel-mounted brake shoe 31 connected thereto being pressed downward from above or upward from below about a joint, depending on the direction of movement of the rotating element 19, against the guide rail 50, such that the movement of the elevator car is braked.

Figure 9:
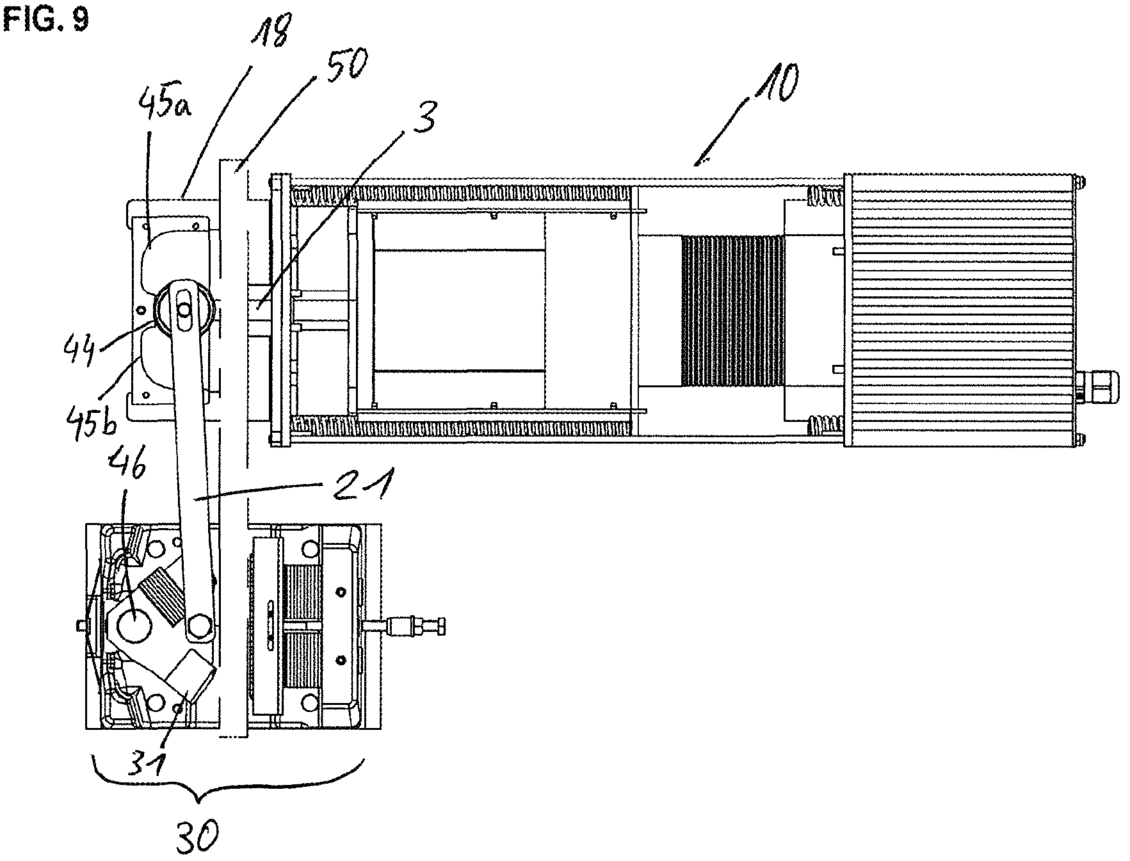
FIG. 9 illustrates another embodiment of the dual-functioning gripping device according to the present disclosure.

FIG. 9 shows another example embodiment of the dual-functioning gripping device 20 according to the present disclosure. This embodiment is analogous to the embodiment shown in FIGS. 8*a-c*, and differs only substantially in terms of the design of the bearing surface 18*a* in the guide cage 18.

This example embodiment has a middle section 44 in which the rotating element 19 is supported when the triggering mechanism 10 is in the standby position. The middle section 44 can be slightly concave. Above and below the middle section 44, the bearing surface has two substantially concave recesses 45*a*, 45*b*, into which the rotating element 19 moves when it comes in contact with the guide rail 50, such that it exerts a force, substantially orthogonal to the axial movement of the triggering rod 3, on the activation lever 21 and thus on the brake shoe 31.

The embodiments described above are merely exemplary, and the present disclosure is not limited in any way to the embodiments shown in the drawings.

LIST OF REFERENCE SYMBOLS

1 supporting frame
2 triggering element/slide element that forms the triggering element
3 triggering rod
4*a*, 4*b* springs
5*a*, 5*b* coils
5*c*, 5*d* electromagnets
6*a*, 6*b* electromagnets
7*a*, 7*b* guide strips
8*a* connecting strip
8*b* rear frame strip
9 securing element
9*a, b* first and second part
9*c* securing element
10 triggering mechanism
11 groove
12*a, b* recesses
13*a, b* projections
14*a, b* stop elements
15 clamping slide
16 permanent magnet
17 position detection sensors
18 guide cage
18*a* bearing surface
19 rotating element
20 gripping device
21 activation lever
21*a, b* end sections
21*c* joint
22 connecting rod
23 hole
24 oblong hole
25 spring element
26 setscrew
30 brake device
31 brake shoe
32 brake pad
33 spring assembly
40 deflector unit
41 bearing element
42 bearing point
43 lever element
44 middle section of the bearing surface
45*a, b* recesses in the bearing surface
50 elevator guide rail
60 triggering mechanism housing
70 elevator car
80 mount
L1, L2 direction of extension
B1, B2 direction of movement
R, R1 rotation

The invention claimed is:

1. A triggering mechanism for a gripping device in an elevator system, comprising:
a supporting frame;
a triggering element that can move axially in the supporting frame, which has a triggering rod on the end that extends through an end section of the supporting frame that can be attached to an activation lever for the gripping device;
springs that act on the triggering element at least when in a first standby position; and
magnetic retaining means, which are designed to retain the triggering element in the standby position against the spring tension when supplied with electricity,
wherein the triggering element is designed as a frame-like slide element having two lateral guide strips and a connecting strip as a side orthogonal to the guide strips, wherein the guide strips constitute opposing sides of the frame-like slide element, wherein the guide strips extend in the axial direction of movement of the triggering element and contact two opposite sides of the supporting frame to guide the frame-like slide element in the supporting frame, and wherein the connecting strip supports the triggering rod.

2. The triggering mechanism according to claim 1, wherein the guide strips extend from the connecting strip in a direction opposite the direction of extension from the triggering rod.

3. The triggering mechanism according to claim 1, wherein the connecting strip has an integrated bearing element in which an end section of the triggering rod is supported, such that it can rotate, move radially, and/or tilt.

4. The triggering mechanism according to claim 1, wherein the frame-like slide element has a rear frame strip on a side facing away from the triggering rod that is parallel to the connecting strip, and wherein the frame-like slide element is a frame element that can be snapped together, in which the individual frame elements are snapped together with projections, recesses, and/or holes.

5. The triggering mechanism according to claim 1, wherein the springs in the triggering mechanism comprise two compression springs extending along the sides of the frame-like slide element.

6. The triggering mechanism according to claim 5, wherein the guide strips have laterally projecting stop elements for the springs.

7. The triggering mechanism according to claim 5, wherein the compression springs extend between an end section of the supporting frame facing the triggering rod and an end section of the frame-like slide element facing away from the triggering rod.

8. The triggering mechanism according to claim 1, wherein the magnetic retaining means comprise two electromagnets located between the triggering element and an end section of the supporting frame, through which the triggering rod extends, the electromagnets, when supplied with electricity, exerting a retaining force on the frame-like slide element.

9. The triggering mechanism according to claim 8, wherein the triggering mechanism comprises a clamping slide that can move independently of the triggering element, which has an end section in which the magnetic retaining means are located, and wherein the clamping slide is designed to return the triggering element from a triggered position to the standby position by interacting with the magnetic retaining means.

10. The triggering mechanism according to claim 8, wherein the electromagnets are located between the connecting strip in the frame-like slide element and the end section of the supporting frame through which the triggering rod extends, to thereby exert the retaining force on the connecting strip in the frame-like slide element when the electromagnets are supplied with electricity.

11. The triggering mechanism according to claim 1, wherein the magnetic retaining means comprise two stationary and opposing coils in the supporting frame that interact with a permanent magnet lying between them on the triggering element and dedicated thereto, which are placed and designed such that the coils enable an axial movement of the triggering element against the spring force of the springs and a retaining of the triggering element in a standby position.

12. The triggering mechanism according to claim 1, wherein the triggering mechanism contains position detection sensors with which the axial positions of the moving triggering element and/or the moving clamping slide can be continuously detected in the supporting frame.

13. The triggering mechanism according to claim 1, wherein the frame-like slide element has a rear frame strip on a side facing away from the triggering rod that is parallel to the connecting strip, and wherein the springs in the triggering mechanism comprise two compression springs extending along the sides of the frame-like slide element.

14. The triggering mechanism according to claim 13, wherein the rear frame strip has laterally projecting stop elements for the springs.

15. A gripping device comprising a brake device in and/or on a guide rail for an elevator car, the brake device connected to an activation lever for selectively triggering the brake device, and a triggering mechanism comprising a supporting frame;

a triggering element that can move axially in the supporting frame, which has a triggering rod on the end that extends through an end section of the supporting frame that can be attached to the activation lever;

springs that act on the triggering element at least when in a first standby position; and magnetic retaining means designed to retain the triggering element in the standby position against the spring tension when supplied with electricity, wherein the triggering element is designed as a frame-like slide element having two lateral guide strips and a connecting strip as a side orthogonal to the guide strips, wherein the guide strips constitute opposing sides of the frame-like slide element, wherein the guide strips extending in the axial direction of movement of the triggering element and contact two opposite sides of the supporting frame to guide the frame-like slide element in the supporting frame, and wherein the connecting strip supports the triggering rod, and wherein the triggering mechanism is connected to the activation lever.

16. The gripping device according to claim 15, wherein the gripping device comprises a deflector unit, which is designed to convert an axial movement of the triggering rod into a rotation of a connecting rod in the gripping device, and wherein the connecting rod is designed to connect at least two brake devices to the triggering mechanism.

17. The gripping device according to claim 15, wherein the triggering mechanism has a guide cage on the triggering rod that has a bearing surface facing the triggering mechanism and a rotating element supported therein, in particular a knurled wheel, which is connected to an activation lever in the brake device, wherein the rotating element and guide cage are placed and designed such that a guide rail for the elevator can be placed between the bearing surface and an end section of the supporting frame for the triggering mechanism.

18. The gripping device according to claim 17, wherein the rotating element and the guide cage are placed and designed such that the rotating element presses against a guide rail for the elevator when the triggering mechanism is triggered, and rolls along it in a direction substantially orthogonal to the direction of extension for the triggering rod, and/or clamps the rotating element between the bearing surface and the guide rail.

19. The gripping device according to claim 17, wherein the gripping device is designed to brake the elevator car connected thereto in a first direction, and in an opposite, second direction of movement.

20. The gripping device according to claim 15, wherein the activation lever can rotate to selectively trigger the brake device.

* * * * *